US010563292B2

(12) United States Patent
Yang et al.

(10) Patent No.: US 10,563,292 B2
(45) Date of Patent: Feb. 18, 2020

(54) METAL MATERIAL FOR 3-DIMENSIONAL PRINTING, METHOD FOR MANUFACTURING THE SAME, AND METHOD FOR 3-DIMENSIONAL PRINTING USING THE SAME

(71) Applicants: ELECTRONICS AND TELECOMMUNICATIONS RESEARCH INSTITUTE, Daejeon (KR); Daelim Chemical Co., Ltd., Gyeongsangnam-do (KR)

(72) Inventors: Yong Suk Yang, Daejeon (KR); Hong Hyun Shin, Seoul (KR); In-Kyu You, Gongju-si (KR); Sunghoon Hong, Daejeon (KR)

(73) Assignees: ELECTRONICS AND TELECOMMUNICATIONS RESEARCH INSTITUTE, Daejeon (KR); DAELIM CHEMICAL CO., LTD., Gyeongsangnam-do (KR)

( * ) Notice: Subject to any disclaimer, the term of this patent is extended or adjusted under 35 U.S.C. 154(b) by 856 days.

(21) Appl. No.: 15/094,643

(22) Filed: Apr. 8, 2016

(65) Prior Publication Data
US 2016/0298215 A1 Oct. 13, 2016

(30) Foreign Application Priority Data

Apr. 9, 2015 (KR) .................. 10-2015-0050146
Apr. 15, 2015 (KR) .................. 10-2015-0053268
Dec. 29, 2015 (KR) .................. 10-2015-0188759

(51) Int. Cl.
B23K 35/26 (2006.01)
C22C 28/00 (2006.01)
(Continued)

(52) U.S. Cl.
CPC ............ *C22C 28/00* (2013.01); *B22D 21/007* (2013.01); *B22D 23/00* (2013.01); *B22F 1/025* (2013.01);
(Continued)

(58) Field of Classification Search
None
See application file for complete search history.

(56) References Cited

U.S. PATENT DOCUMENTS 5,389,160 A * 2/1995 Melton ............... B23K 35/025
148/24
5,641,454 A * 6/1997 Kito .......................... B22F 1/02
148/405

(Continued)

FOREIGN PATENT DOCUMENTS

CN 101245443 A 8/2008
CN 101323020 A 12/2008
(Continued)

OTHER PUBLICATIONS

Massalski, T.B., Editor-in-Chief, Binary Alloy Phase Diagrams, American Society for Metals, 1986, pp. 502, 523, 1110 and 1759.*
(Continued)

*Primary Examiner* — George Wyszomierski
(74) *Attorney, Agent, or Firm* — Rabin & Berdo, P.C.

(57) ABSTRACT

Provided is a metal material for 3D printing, the metal material including an alloy that includes a eutectic metal, and a metal particle, wherein the melting point of the alloy is about 100° C. to about 300° C., and the melting point of the metal particle exceeds about 300° C.

14 Claims, 5 Drawing Sheets

(51) Int. Cl.
*B22D 23/00* (2006.01)
*B22D 21/00* (2006.01)
*C22C 13/00* (2006.01)
*C22C 12/00* (2006.01)
*C22C 13/02* (2006.01)
*B22F 1/02* (2006.01)
*C22C 1/02* (2006.01)
*B33Y 10/00* (2015.01)
*B33Y 70/00* (2020.01)

(52) U.S. Cl.
CPC ............ *B23K 35/264* (2013.01); *B33Y 10/00* (2014.12); *B33Y 70/00* (2014.12); *C22C 1/02* (2013.01); *C22C 12/00* (2013.01); *C22C 13/00* (2013.01); *C22C 13/02* (2013.01)

(56) References Cited

U.S. PATENT DOCUMENTS

| | | | | |
|---|---|---|---|---|
| 6,059,952 | A | * | 5/2000 | Kang ................. C25D 17/16 205/143 |
| 6,110,608 | A | | 8/2000 | Tanimoto et al. |
| 2003/0042045 | A1 | * | 3/2003 | Koskenmaki ......... H05B 3/286 174/261 |
| 2010/0252616 | A1 | | 10/2010 | Shearer et al. |
| 2012/0055586 | A1 | * | 3/2012 | McIsaac ............. B23K 1/0008 148/24 |
| 2014/0199115 | A1 | * | 7/2014 | de Avila Ribas .... B23K 35/262 403/272 |
| 2015/0032241 | A1 | | 1/2015 | Lee et al. |

FOREIGN PATENT DOCUMENTS

| | | |
|---|---|---|
| CN | 102059471 A | 5/2011 |
| CN | 102492870 A | 6/2012 |
| CN | 103084750 A | 5/2013 |
| CN | 203992400 U | 12/2014 |
| CN | 104416159 A | 3/2015 |
| JP | H10229152 A | 8/1998 |
| JP | 2013-168628 A | 8/2013 |
| JP | 2014-167915 A | 9/2014 |
| KR | 10-1990-7000273 | 8/1990 |
| KR | 10-2009-0011111 A | 2/2009 |
| KR | 10-2009-0090372 A | 8/2009 |
| KR | 10-2013-0037631 | 4/2013 |
| KR | 10-2014-0065459 A | 5/2014 |
| WO | WO-8910254 A1 | 11/1989 |
| WO | WO-2008073297 A2 | 6/2008 |
| WO | WO-2013044047 A1 | 3/2013 |
| WO | WO-2014/074947 A2 | 5/2014 |

OTHER PUBLICATIONS

K.-F.Becker, et al., "Development of a scaleable Interconnection Technology for Nano Packaging", NSTI-Nanotech 2005, vol. 4, pp. 445-448, 2005.

Yuanyuan Li, et al., "Novel Material Science and Technology, Metal Materials edition, 1st", Sep. 30, 2012, p. 919, South China University of Technology Press.

* cited by examiner

METAL MATERIAL FOR 3-DIMENSIONAL PRINTING, METHOD FOR MANUFACTURING THE SAME, AND METHOD FOR 3-DIMENSIONAL PRINTING USING THE SAME

CROSS-REFERENCE TO RELATED APPLICATIONS

This U.S. non-provisional patent application claims priority under 35 U.S.C. § 119 of Korean Patent Application Nos. 10-2015-0050146, filed on Apr. 9, 2015, 10-2015-0053268, filed on Apr. 15, 2015, and 10-2015-0188759, filed on Dec. 29, 2015, the entire contents of which are hereby incorporated by reference.

BACKGROUND

The present disclosure herein relates to a material for 3D printing, and more particularly, to a metal material for 3D printing.

3D printing methods, which are being actively developed recently, can use 3D printers to receive information that is designed three dimensionally and print three dimensional shapes. 3D printers may use digital blueprints to produce three dimensional objects with relative ease. 3D blueprints are drawn using programs such as 3D CAD which are capable of drafting the 3D blueprints for 3D printing. Models can be created from scratch but are also made by using a template to modify a basic form. Some 3D printing service companies provide online tools which allow even laypersons to easily produce 3D blueprints. In addition, instead of drawing the blueprint, 3D blueprints are also made by using only a 3D scanner or through a mechanical method by taking a photograph.

3D printing is already used by industry in parts of the production process. Recently, expectations and demand are increasing for a new market in product mockups of accessories, and the like, using the customized low-volume, high-variety production processes of 3D printing.

SUMMARY

An object of the present disclosure is to provide a metal material for 3D printing which can be melt-laminated with a plastic material for 3D printing.

Another object of the present disclosure is to provide a metal material for 3D printing, the metal material having a small change in melting point.

However, objects of the present disclosure are not limited to the above-described objects.

An embodiment of the inventive concept provides a metal material for 3D printing, the metal material including an alloy including a eutectic metal; and a metal particle, wherein the melting point of the alloy is about 100° C. to about 300° C., and the melting point of the metal particle exceeds about 300° C.

In an embodiment the eutectic metal alloy may be any one of a tin (Sn)-bismuth (Bi) alloy, a tin (Sn)-silver (Ag)-copper (Cu) alloy, a lead (Pb)-tin (Sn) alloy, an indium (In)-silver (Ag) alloy, an indium (In)-tin (Sn) alloy, a tin (Sn)-zinc (Zn) alloy, a tin (Sn)-antimony (Sb) alloy, a tin (Sn)-indium (In)-silver (Ag) alloy, a tin (Sn)-lead (Pb)-silver (Ag) alloy, or an indium (In)-bismuth (Bi)-tin (Sn) alloy.

In an embodiment, the tin (Sn)-bismuth (Bi) alloy may contain about 42.95 wt % of tin and 57.05 wt % of bismuth, the tin (Sn)-silver (Ag)-copper (Cu) alloy may contain about 95.6 wt % of tin, 3.5 wt % of silver, and 0.9 wt % of copper, the lead (Pb)-tin (Sn) alloy may contain about 38.1 wt % of lead and about 51.9% of tin, the indium (In)-silver (Ag) alloy may contain about 97 wt % of and about 3 wt % of silver, the indium (In)-tin (Sn) alloy may contain about 52 wt % of indium and about 48 wt % of tin, the tin (Sn)-zinc (Zn) alloy may contain about 91 wt % of tin and about 9 wt % of zinc, the tin (Sn)-antimony (Sb) alloy may contain about 95 wt % of tin and about 5 wt % of antimony, the tin (Sn)-indium (In)-silver (Ag) alloy may contain about 77.2 wt % of tin, about 20 wt % of indium, and about 2.8 wt % of silver, the tin (Sn)-lead (Pb)-silver (Ag) alloy may contain about 62.5 wt % of tin, about 36.1 wt % of lead, and about 1.4 wt % of silver, and the indium (In)-bismuth (Bi)-tin (Sn) alloy may contain about 51 wt % of indium, about 32.5 wt % of bismuth, and about 16.5 wt % of tin.

In an embodiment, the size of the metal particle may be about several nanometers to about several hundred micrometers.

In an embodiment, the metal particle may contain any one of copper (Cu), silver (Ag), gold (Au), aluminum (Al), or platinum (Pt).

In an embodiment, the metal material may further include a shell which is coated on the surface of the metal particle, wherein the shell and the metal particle contain different materials from each other.

In an embodiment, the material contained in the shell may change the melting point of the alloy less than the material contained in the metal particle.

In an embodiment, the material in the shell may include at least one of silver (Ag), nickel (Ni), iron (Fe), silicon (Si), tungsten (W), cobalt (Co), aluminum (Al), carbon (C) or graphene.

An embodiment of the inventive concept provides a method for manufacturing a metal material for 3D printing, the method including forming a first liquid alloy through a first heat treatment of eutectic metal specimens; forming a solid alloy through a first cooling of the liquid alloy; forming a second liquid alloy through a second heat treatment of the solid alloy; forming an alloy-particle mixture by mixing the metal particle with the second liquid alloy; and forming a metal material for three dimensional (3D) printing through a second cooling of the alloy-particle mixture, wherein the temperature of the first heat treatment is higher than the eutectic point of the eutectic metal specimens, and the temperature of the second heat treatment is about 100° C. to about 300° C.

In an embodiment, the solid alloy may be any one of a tin (Sn)-bismuth (Bi) alloy, a tin (Sn)-silver (Ag)-copper (Cu) alloy, a lead (Pb)-tin (Sn) alloy, an indium (In)-silver (Ag) alloy, an indium (In)-tin (Sn) alloy, a tin (Sn)-zinc (Zn) alloy, a tin (Sn)-antimony (Sb) alloy, a tin (Sn)-indium (In)-silver (Ag) alloy, a tin (Sn)-lead (Pb)-silver (Ag) alloy, or an indium (In)-bismuth (Bi)-tin (Sn) alloy.

In an embodiment, the tin (Sn)-bismuth (Bi) alloy may contain about 42.95 wt % of tin and 57.05 wt % of bismuth, the tin (Sn)-silver (Ag)-copper (Cu) alloy may contain about 95.6 wt % of tin, 3.5 wt % of silver, and 0.9 wt % of copper, the lead (Pb)-tin (Sn) alloy may contain about 38.1 wt % of lead and about 51.9% of tin, the indium (In)-silver (Ag) alloy may contain about 97 wt % of and about 3 wt % of silver, the indium (In)-tin (Sn) alloy may contain about 52 wt % of indium and about 48 wt % of tin, the tin (Sn)-zinc (Zn) alloy may contain about 91 wt % of tin and about 9 wt % of zinc, the tin (Sn)-antimony (Sb) alloy may contain about 95 wt % of tin and about 5 wt % of antimony, the tin (Sn)-indium (In)-silver (Ag) alloy may contain about 77.2 wt % of tin, about 20 wt % of indium, and about 2.8 wt % of silver, the tin (Sn)-lead (Pb)-silver (Ag) alloy may contain about 62.5 wt % of tin, about 36.1 wt % of lead, and about 1.4 wt % of silver, and the indium (In)-bismuth (Bi)-tin (Sn) alloy may contain about 51 wt % of indium, about 32.5 wt % of bismuth, and about 16.5 wt % of tin.

In an embodiment, the metal particle may further include a shell which is coated on the surface of the metal particle, wherein the shell and the metal particle contain different materials from each other.

In an embodiment, the first heat treatment may be performed under a vacuum atmosphere, a foaming gas atmosphere, an inert gas atmosphere, or a gas atmosphere in which a foaming gas and an inert gas are mixed.

In an embodiment, in the first cooling, the temperature may decrease at a rate of about 50° C. to 200° C. per minute.

An embodiment of the inventive concept provides a 3D printing method that uses a metal material, the method including melting the metal material at about 100° C. to about 300° C.; and laminating the molten metal material, wherein the metal material is a mixture of a eutectic metal-containing alloy and a metal particle, the melting point of the alloy being about 100° C. to about 300° C., and the melting point of the metal particle exceeding about 300° C.

In an embodiment, a process for melting the metal material may be performed under a vacuum atmosphere, a foaming gas atmosphere, an inert gas atmosphere, or a gas atmosphere in which a foaming gas and an inert gas are mixed.

In an embodiment, the size of the metal particle may be about several nanometers to about several hundred micrometers.

In an embodiment, the method may further include a shell which is coated on the surface of the metal particle, the shell and the metal particle containing different materials from each other.

In an embodiment, the shell may contain at least one of silver (Ag), nickel (Ni), iron (Fe), silicon (Si), tungsten (W), cobalt (Co), aluminum (Al), carbon (C) or graphene.

In an embodiment, the method may further include melting and laminating a plastic material, wherein the metal material and the plastic material are used in a single 3D printing process to form a single three dimensional structure.

In an embodiment, the metal particle may further include any one of copper (Cu), silver (Ag), gold (Au), aluminum (Al), or platinum (Pt).

In an embodiment, the method may further include a shell which is coated on the surface of the metal particle, in which the melting point of the alloy which is in a state containing 1 wt % more of the material in the shell may be higher than the melting point of the alloy which is in a state containing 1 wt % more of the material in the metal particle.

DETAILED DESCRIPTION

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

In the disclosure, it will be understood that when an element is referred to as being on another element, it can be directly on the other element, or intervening elements may also be present. Like reference numerals refer to like elements throughout.

Embodiments described herein are described with reference to perspective views, enlarged views, and/or flow charts, which are exemplary drawings of the technical concept of the inventive concept. In the drawings, the thicknesses of areas are exaggerated for effective description of the technical contents. Areas illustrated in the drawings are approximate in nature. The shapes of such areas are merely for illustrating particular forms or areas in elements, and do not limited the scope of the inventive concept. It will be understood that, although the terms first, second, third, etc. may be used herein to describe various elements, these elements should not be limited by these terms. These terms are only used to distinguish one element from another element. The embodiments described herein also include complementary embodiments thereof.

The terms used herein are for describing exemplary embodiments and do not limit the inventive concept. In the specification, singular forms also include the plural forms as well, unless the context clearly indicates otherwise. The terms "comprises" and/or "comprising", when used in this specification, do not preclude the presence or addition of one or more other elements.

Hereinafter, detailed description of the present invention is given by describing exemplary embodiments of the technical concept of the present invention with reference to the accompanying drawings.

Figure 1:
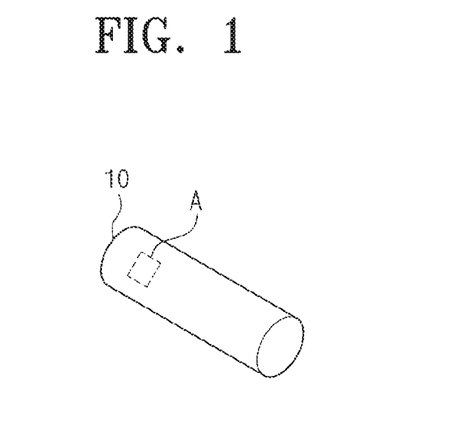
FIG. 1 is a perspective view of a metal material for 3D printing according to an embodiment of the inventive concept.
Figure 2:
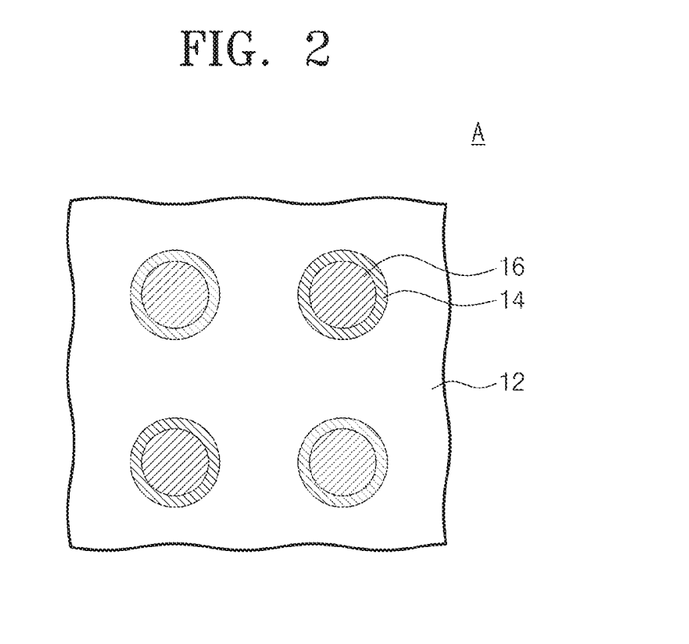
FIG. 2 is an enlarged view for illustrating a core-shell particle according to an embodiment of the inventive concept, and is in accordance with area A in FIG. 1.

FIG. 1 is a perspective view of a metal material for 3D printing according to an embodiment of the inventive concept. FIG. 2 is an enlarged view for illustrating a core-shell particle according to an embodiment of the inventive concept, and is in accordance with area A in FIG. 1. Only a filament shaped metal material for 3D printing is illustrated, but the shape of the metal material is not limited thereto. For example, the metal material for 3D printing may be powder or granular shaped.

Referring to FIGS. 1 and 2, a filament shaped metal material 10 (hereinafter, referred to as a metal filament) for 3D printing may be provided. The metal filament 10 may be used for printing by being melted in a below-described nozzle for 3D printing. This printing method may be referred to as a fused deposition modeling (FDM) method, a material extrusion (ME) method, a material jetting (MJ) method, a selective laser sintering (SLS) method, a direct energy deposition (DED) method, a power bed fusion (PBF) method, a hot-melt method, or the like. The metal filament 10 may include an alloy 12 and a metal particle 16.

The alloy 12 may include a eutectic metal (or eutectic alloy). The eutectic metal may have a specific melting point.

The composition of the eutectic metal in a solid phase may be the same as the composition of the molten eutectic metal. The melting point of the alloy 12 may be about 100° C. to about 300° C. In an embodiment, the alloy 12 may contain tin (Sn) and bismuth (Bi). The mass ratio of tin to bismuth may be controlled such that the alloy 12 has a melting point of about 100° C. to about 300° C. For example, the alloy 12 may contain 42.95 wt % of tin and 57.05 wt % of bismuth. Here, the melting point of the tin-bismuth alloy may be about 144° C.

In an embodiment, the alloy 12 may contain tin (Sn), silver (Ag), and copper (Cu). The mass ratio of tin to silver to copper may be controlled such that the alloy 12 has a melting point of about 100° C. to about 300° C. For example, the tin-silver-copper alloy may contain 95.6 wt % of tin, 3.5 wt % of silver, and 0.9 wt % of copper. Here, the melting point of the tin-silver-copper alloy may be about 220° C.

In an embodiment, the alloy 12 may contain indium (In) and silver (Ag). The mass ratio of indium to silver may be controlled such that the alloy 12 has a melting point of about 100° C. to about 300° C. For example, the indium-silver alloy may contain about 97 wt % of indium and about 3 wt % of silver. Here, the melting point of the indium-silver alloy may be about 146° C.

In an embodiment, the alloy 12 may contain lead (Pb) and tin (Sn). The mass ratio of lead to tin may be controlled such that the alloy 12 has a melting point of about 100° C. to about 300° C. For example, the lead-tin alloy may contain about 38.1 wt % of lead and about 51.9 wt % of tin. Here, the melting point of the lead-tin alloy may be about 183° C.

In an embodiment, the alloy 12 may contain indium (In) and tin (Sn). The mass ratio of indium to tin may be controlled such that the alloy 12 has a melting point of about 100° C. to about 300° C. For example, the indium-tin alloy may contain about 52 wt % of indium and about 48 wt % of tin. Here, the melting point of the indium-tin alloy may be about 118° C.

In an embodiment, the alloy 12 may contain tin (Sn) and zinc (Zn). The mass ratio of tin to zinc may be controlled such that the alloy 12 has a melting point of about 100° C. to about 300° C. For example, the tin-zinc alloy may contain about 91 wt % of tin and about 9 wt % of zinc. Here, the melting point of the tin-zinc alloy may be about 199° C.

In an embodiment, the alloy 12 may contain tin (Sn) and antimony (Sb). The mass ratio of tin to antimony may be controlled such that the alloy 12 has a melting point of about 100° C. to about 300° C. For example, the tin-antimony alloy may contain about 95 wt % of tin and about 5 wt % of antimony. Here, the melting point of the tin-antimony alloy may be about 235° C.

In an embodiment, the alloy 12 may contain tin (Sn), indium (In), and silver (Ag). The mass ratio of tin to indium to silver may be controlled such that the alloy 12 has a melting point of about 100° C. to about 300° C. For example, the tin-indium-silver alloy may contain about 77.2 wt % of tin, about 20 wt % of indium, and about 2.8 wt % of silver. Here, the melting point of the tin-indium-silver alloy may be about 175° C.

In an embodiment, the alloy 12 may contain tin (Sn), lead (Pb), and silver (Ag). The mass ratio of tin to lead to silver may be controlled such that the alloy 12 has a melting point of about 100° C. to about 300° C. For example, the tin-lead-silver alloy may contain about 62.5 wt % of tin, about 36.1 wt % of lead, and about 1.4 wt % of silver. Here, the melting point of the tin-lead-silver alloy may be about 179° C.

In an embodiment, the alloy 12 may contain indium (In), bismuth (Bi), and tin (Sn). The mass ratio of indium to bismuth to tin may be controlled such that the alloy 12 has a melting point of about 300° C. or lower. For example, the indium-bismuth-tin alloy may contain about 51 wt % of indium, about 32.5 wt % of bismuth, and about 16.5 wt % of tin. Here, the melting point of the indium-bismuth-tin alloy may be about 60° C.

In an embodiment, the alloy 12 may include a gallium (Ga)-indium (In)-tin (Sn) based or gallium (Ga)-indium (In) based eutectic metal. For example, the melting point of the alloy 12 that includes the gallium (Ga)-indium (In)-tin (Sn) based eutectic metal or the gallium (Ga)-indium (In) based eutectic metal may be about 100° C. to about 300° C.

The metal particle 16 may be provided inside of the metal filament 10. In an embodiment, the metal particle 16 may include at least one of a copper (Cu), aluminum (Al), silver (Ag), gold (Au), or platinum (Pt) particle. The melting point of the metal particle 16 may be higher than the melting point of the alloy 12. In an embodiment, the melting point of the metal particle 16 may be higher than about 300° C. For example, the melting point of the copper (Cu) particle may be about 1084.9° C. and the melting point of the aluminum (Al) particle may be about 660.3° C.

In an embodiment, a shell 14 may be provided on a surface of the metal particle 16. The shell 14 may be coated on the surface of the metal particle 16. The metal particle 16 and the shell 14 may form a core-shell structure. The core-shell structure is a structure in which the core is at the center and the shell surrounds the core. Here, the metal particle 16 may be the core. The metal particle 16 may include a microparticle or a nanoparticle. That is, the size of the metal particle 16 may be about several nanometers (nm) to about several hundred micrometers (μm).

The shell 14 may include a single shell or a plurality of shells. The plurality of shells may be shells containing different materials from each other. The material contained in the shell 14 may change the melting point of the alloy 12 less than the material contained in the metal particle 16. For example, when copper (Cu) or silver (Ag) of equal mass is melted in a tin (Sn)-bismuth (Bi)-silver (Ag) alloy, the melting point of the tin-bismuth-silver alloy may be increased less when silver is melted. In an embodiment, the core is copper (Cu) and the shell 14 may be at least one of silver (Ag), nickel (Ni), iron (Fe), silicon (Si), tungsten (W), cobalt (Co), aluminum (Al), carbon (C), carbon nanotube (CNT), C60, or graphene. In an embodiment, the core is an aluminum (Al) particle and the shell 14 may be at least one of silver (Ag), nickel (Ni), iron (Fe), silicon (Si), tungsten (W), cobalt (Co), carbon (C), carbon nanotube (CNT), C60, or graphene.

According to an embodiment of the inventive concept, the nozzle of the 3D printer may discharge the metal filament to the outside of the nozzle by melting the metal filament 10 at a temperature which is between the melting point of the metal particle 16 and the melting point of the alloy 12. For example, the nozzle of the 3D printer may melt and discharge the metal filament 10 at about 100° C. to about 300° C. Here, the molten metal filament 10 may contain the metal particle 16. The discharged metal filament 10 may be cooled and thereby hardened. Another metal filament 10 may be melted and then discharged on the hardened metal filament 10. The above process may be repeated to form a three dimensional structure using the metal material.

Figure 3:
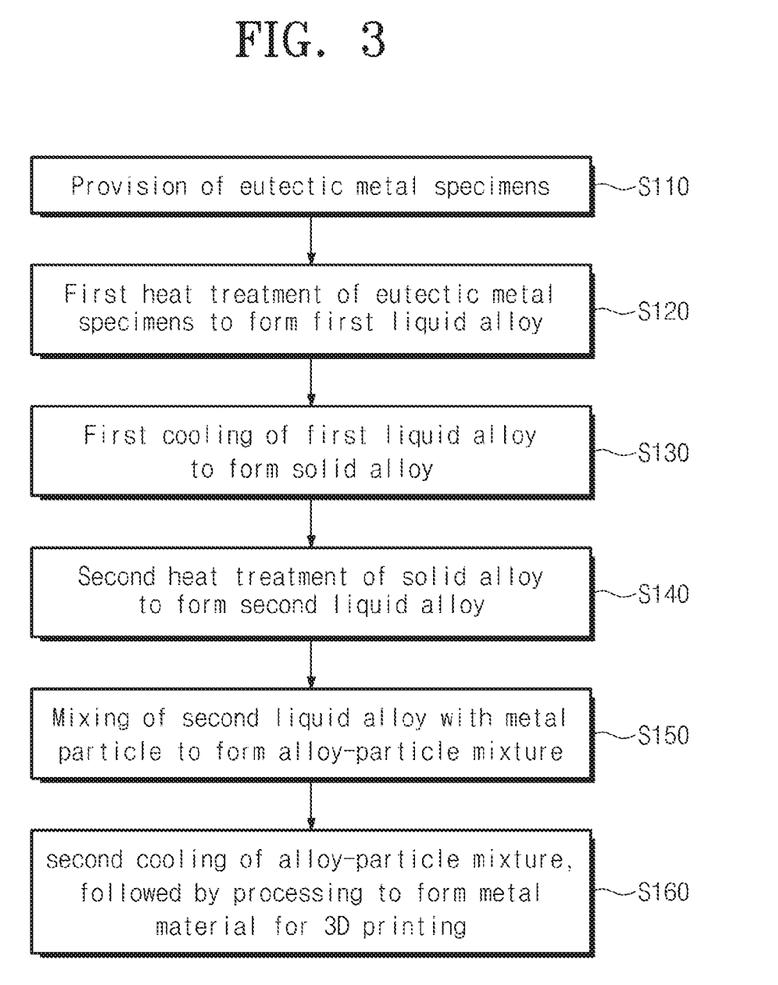
FIG. 3 is a flow chart for illustrating a method for manufacturing a metal material for 3D printing according to an embodiment of the inventive concept.
Figure 5:
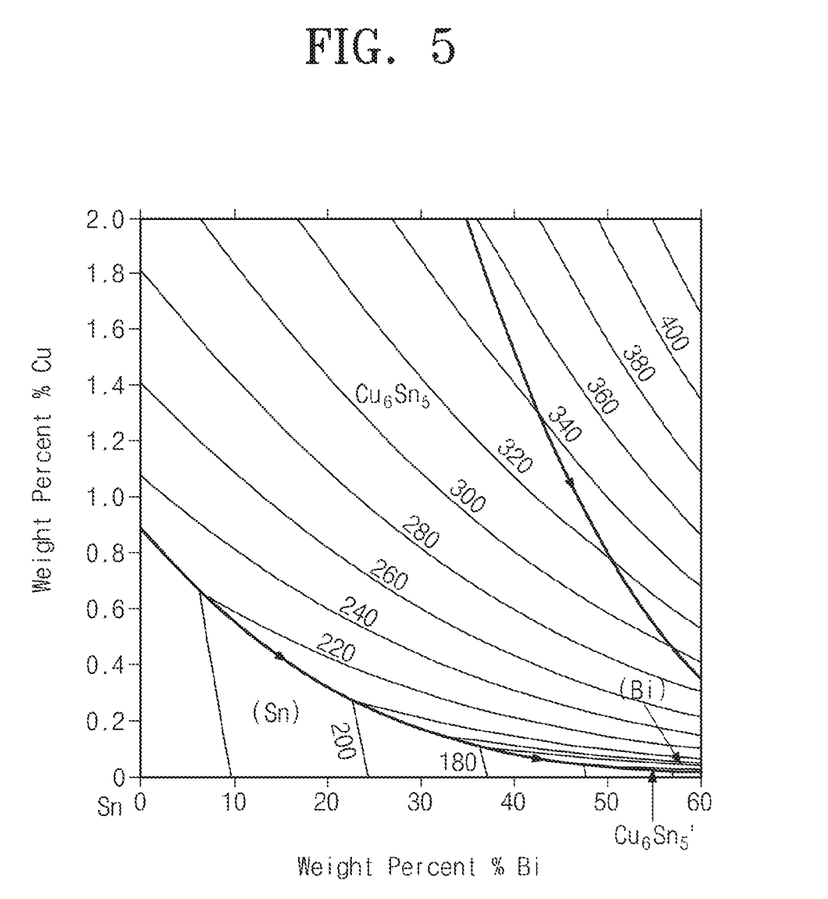
FIGS. 5 and 6 are phase diagrams of an alloy containing tin (Sn), bismuth (Bi), and copper (Cu), and an alloy containing tin (Sn), bismuth (Bi), and silver (Ag).
Figure 6:
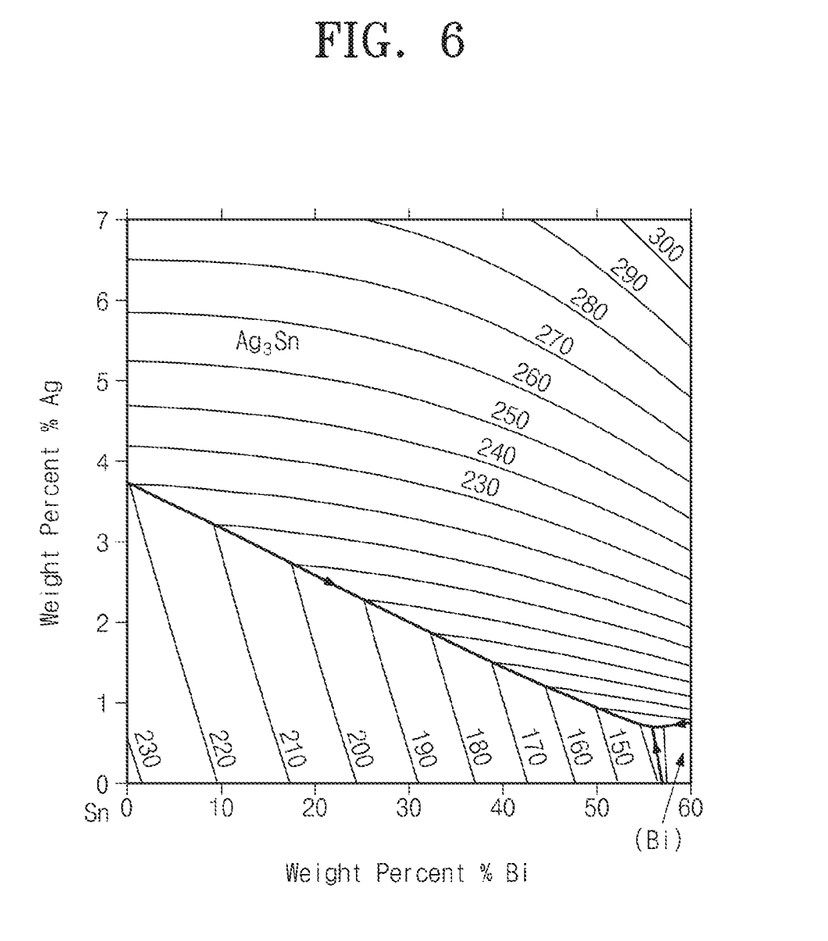

FIG. 3 is a flow chart for illustrating a method for manufacturing a metal material for 3D printing according to an embodiment of the inventive concept. FIGS. 5 and 6 are phase diagrams of an alloy containing tin (Sn), bismuth (Bi), and copper (Cu), and an alloy containing tin (Sn), bismuth (Bi), and silver (Ag). For conciseness of description, description of elements that are substantially the same as described with reference to FIGS. 1 and 2 may be excluded.

Referring to FIG. 3, tin (Sn) and bismuth (Bi) specimens may be provided inside of a chamber S110. In an embodiment, the tin and bismuth specimens may be provided inside of the chamber in powder or granular form. In an embodiment, the inside of the chamber may be under a vacuum atmosphere. In an embodiment, the inside of the chamber may be under a foaming gas atmosphere, an inert gas atmosphere, or a gas atmosphere in which a foaming gas and an inert gas are mixed. For example, the foaming gas may include a mixed gas of argon and hydrogen and/or a mixed gas of nitrogen and hydrogen. For example, the inert gas may include argon gas and/or nitrogen gas. Oxidation of the tin (Sn) and bismuth (Bi) specimens may be excluded or minimized under the vacuum atmosphere, the foaming gas atmosphere, the inert gas atmosphere, or the gas atmosphere in which the foaming gas and the inert gas are mixed.

The tin (Sn) specimen and the bismuth (Bi) specimen may undergo a first heat treatment to form a first liquid alloy (S120). In an embodiment, the tin specimen and the bismuth specimen may undergo the first heat treatment under the vacuum atmosphere, the foaming gas atmosphere, or the inert gas atmosphere. The tin specimen and the bismuth specimen may be melted though the first heat treatment. A first heat treatment process may increase the temperature inside of the chamber up to a first heat treatment temperature and then maintain the temperature for a predetermined time. In an embodiment, the temperature inside of the chamber may be increased at a rate of about 5° C./min to about 50° C./min to reach the first heat treatment temperature. In an embodiment, the first heat treatment temperature may be higher than the eutectic point of tin and bismuth. In an embodiment, the temperature of the first heat treatment may be higher than the melting point of tin and the melting point of bismuth. For example, the first heat treatment temperature may be about 800° C. to about 1200° C. In an embodiment, the first heat treatment process may be performed for at least 30 minutes. In an embodiment, the first heat treatment process may be performed under an atmosphere of argon gas, nitrogen gas, a mixed gas of argon and (about 3 to 5% of) hydrogen, and/or a mixed gas of nitrogen and (about 3 to 5% of) hydrogen.

The first liquid alloy may undergo a first cooling to form a solid alloy (S130). In an embodiment, the first liquid alloy may be naturally cooled or may be quenched. For example, the first liquid alloy may be cooled through a quenching in which the temperature is decreased at a rate of about 50° C. to about 200° C. per minute. Thereby, the solid alloy containing tin (Sn) and bismuth (Bi) may be formed. The solid alloy may have amorphous or crystalline phases. The melting point of the solid alloy may be about 300° C. or lower. In an embodiment, the melting point of the solid alloy may be about 130° C. to about 230° C. For example, the melting point of the solid alloy containing 42.95 wt % of tin and 57.05 wt % of bismuth may be about 144° C.

The solid alloy may undergo a second heat treatment to form a second liquid alloy (S140). The second heat treatment may be performed at or below about 300° C. In an embodiment, the solid alloy containing the tin (Sn) specimen or bismuth (Bi) may undergo the second heat treatment under the vacuum atmosphere, the foaming gas atmosphere, or the inert gas atmosphere. For example, the inert gas atmosphere may be the argon gas atmosphere or the nitrogen gas atmosphere, and the foaming gas may include the mixed gas of argon and (about 3 to 5% of) hydrogen or a mixed gas of nitrogen and (about 3 to 5% of) hydrogen. In an embodiment, a second heat treatment temperature may be about 100° C. to about 300° C. For example, the temperature of the second heat treatment may be about 144° C. to about 194° C. The solid alloy may be melted through the second heat treatment process.

The second liquid alloy may be mixed with a metal particle to form an alloy-particle mixture (S150). In an embodiment, the metal particle may be at least one of a copper (Cu), an aluminum (Al), a silver (Ag), a gold (Au), or a platinum (Pt) particle. The metal particle may be surrounded by a shell. In an embodiment, the shell may contain silver (Ag), nickel (Ni), iron (Fe), silicon (Si), tungsten (W), cobalt (Co), aluminum (Al) (that is, other than when the metal particle is aluminum (Al)), carbon (C), carbon nanotube (CNT), C60, or graphene. In an embodiment, an alloy-particle mixture may include about 5 wt % to about 90 wt % of the metal particle. The metal particle may be added to increase the electrical conductivity of the metal material for 3D printing.

The viscosity of the alloy-particle mixture may be greater than the viscosity of the second liquid alloy. For example, the viscosity of the second liquid alloy containing 42.95 wt % of tin and 57.05 wt % of bismuth may be about 10 cP. Here, the second liquid alloy may be obtained by melting the solid alloy containing 42.95 wt % of tin and 57.05 wt % of bismuth at about 150° C. The viscosity of the alloy-particle mixture obtained by mixing the second liquid alloy with 20 wt % of silver (Ag)-coated copper (Cu) particles may be about 4000 cP. For example, the copper particle having a size of about 5 micrometers (μm) may be coated with silver having a thickness of about several to about several hundred nanometers (nm). Here, the shape of the copper particle may be flake shaped. In an embodiment, the alloy-particle mixture and the second liquid alloy may transform into a solid at substantially the same temperature. That is, the melting point of the alloy-particle mixture in a solid phase may be substantially the same as the melting point of the solid alloy.

The effect of the core-shell structure may be described with reference to FIGS. 5 and 6. In an embodiment, the tin (Sn)-bismuth (Bi) second liquid alloy described with reference to FIG. 3 may be mixed with the copper (Cu) particle. The second liquid alloy may contain 42.95 wt % of tin and 57.05 wt % of bismuth. The melting point of the second liquid alloy may be about 144° C. A portion of the copper (Cu) particle may be melted in the second heat treatment process, and thereby a tin (Sn)-bismuth (Bi)-copper (Cu) alloy may be formed. When the weight percentage of copper (Cu) is about 0.4 wt %, the melting point of the tin (Sn)-bismuth (Bi)-copper (Cu) alloy may be about 300° C. The copper (Cu) particle may be surrounded by a silver (Ag) shell. A portion of the silver (Ag) may be melted instead of the copper (Cu), and thereby a tin (Sn)-bismuth (Bi)-silver (Ag) alloy may be formed. When the weight percentage of silver (Ag) is about 6.5 wt %, the melting point of the tin (Sn)-bismuth (Bi)-silver (Ag) alloy may be about 300° C. Thus, when copper (Cu) and silver (Ag) of the same mass is melted, the melting point of the alloy may be increased less in a state in which the silver (Ag) is melted.

The alloy-particle mixture may undergo a second cooling and then be processed to form the metal material for 3D printing S160. In an embodiment, the metal material for 3D printing may be in filament shaped, granular shaped, or powder shaped. The metal material for 3D printing may melt at or below about 300° C. In an embodiment, the metal material for 3D printing may melt at about 100° C. to about 300° C. For example, the metal material for 3D printing may melt at about 144° C. to about 194° C.

According to an embodiment of the inventive concept, the metal material for 3D printing may be used with a plastic material (for example, poly lactic acid (PLA) or acrylonitrile butadiene styrene (ABS)) in a 3D printing process. Here, the 3D printing process may be a melt lamination method (fused deposition modeling (FDM) or hot-melt method). Thus, the metal material for 3D printing and the plastic material may be alternately or concurrently melt discharged to form the single three dimensional structure. For example, the metal material for 3D printing according to an embodiment of the inventive concept may be melt laminated on a plastic three dimensional structure. Here, the heat contained in the metal material for 3D printing may not be high enough to melt the plastic three dimensional structure. Therefore, the metal material for 3D printing may be melt laminated with the plastic material to form the single three dimensional structure. Since the metal material for 3D printing according to an embodiment of the inventive concept may be 3D printed with the plastic material, the time required for producing a product may be reduced. Moreover, since a secondary processing of the 3D printed metal is not needed, a time and cost reducing effect may be realized.

According to an embodiment, the tin (Sn) and bismuth (Bi) specimens used in the method for manufacturing the metal material for 3D printing described with reference to FIG. 3 may be replaced with indium (In) and silver (Ag) specimens. In an embodiment, the temperature of the first heat treatment may be higher than the eutectic temperature of indium and silver. In an embodiment, the temperature of the first heat treatment may be higher than the melting point of indium (In) and the melting point of silver (Ag). For example, the temperature of the first heat treatment may be at least about 962° C., which is the melting point of silver (Ag) which has a higher melting point than indium (In). The temperature of the second heat treatment may be at most about 300° C. In an embodiment, the temperature of the second heat treatment may be about 100° C. to about 300° C. For example, when the solid alloy contains about 97 wt % of indium (In) and about 3 wt % of silver (Ag), the temperature of the second heat treatment may be about 144° C. to about 250° C. Therefore, the metal material for 3D printing which is capable of being melt laminated at about 100° C. to about 300° C. may be provided. According to an embodiment of the inventive concept, the metal material for 3D printing may be used with the plastic material in a single 3D printing process. Here, the 3D printing process may be the melt lamination method (FDM or hot-melt method).

In an embodiment, the tin (Sn) and bismuth (Bi) specimens used in the method for manufacturing the metal material for 3D printing described with reference to FIG. 3 may be replaced with tin (Sn), silver (Ag), and copper (Cu) specimens. In an embodiment, the temperature of the first heat treatment may be higher than the eutectic temperature of tin, silver, and copper. In an embodiment, the temperature of the first heat treatment may be higher than the melting point of tin (Sn), the melting point of silver (Ag), and the melting point of copper (Cu). For example, the temperature of the first heat treatment may be at least about 1084.6° C., which is the melting point of copper (Cu) which has a higher melting point than tin (Sn) and silver (Ag). The temperature of the second heat treatment may be at most about 300° C. In an embodiment, the temperature of the second heat treatment may be about 100° C. to about 300° C. For example, when the solid alloy contains about 95.6 wt % of tin (Sn), about 3.5 wt % of silver (Ag), and about 0.9 wt % of copper, the temperature of the second heat treatment may be about 220° C. to about 270° C. Therefore, the metal material for 3D printing which is capable of being melt laminated at about 100° C. to about 300° C. may be provided. According to an embodiment of the inventive concept, the metal material for 3D printing may be used with the plastic material in the single 3D printing process. Here, the 3D printing process may be the melt lamination method (FDM or hot-melt method).

In an embodiment, the tin (Sn) and bismuth (Bi) specimens used in the method for manufacturing the metal material for 3D printing described with reference to FIG. 3 may be replaced with lead (Pb) and tin (Sn) specimens. In an embodiment, the temperature of the first heat treatment may be higher than the eutectic temperature of lead and tin. In an embodiment, the temperature of the first heat treatment may be higher than the melting point of lead (Pb) and the melting point of tin (Sn). Accordingly, the temperature of the first heat treatment may be at least about 327.5° C., which is the melting point of lead (Pb) which has a higher melting point than tin (Sn). The temperature of the second heat treatment may be at most about 300° C. In an embodiment, the temperature of the second heat treatment may be about 100° C. to about 300° C. For example, when the solid alloy contains about 38.1 wt % of lead (Pb) and about 51.9 wt % of tin (Sn), the temperature of the second heat treatment may be about 183° C. to about 233° C. Therefore, the metal material for 3D printing which is capable of being melt laminated at about 100° C. to about 300° C. may be provided. According to an embodiment of the inventive concept, the metal material for 3D printing may be used with the plastic material in the single 3D printing process. Here, the 3D printing process may be the melt lamination method (FDM or hot-melt method).

Hereinafter, description is given of a method for printing the filament shaped metal material for 3D printing according to an embodiment of the inventive concept, and also of the structure of a 3D printer.

Figure 4:
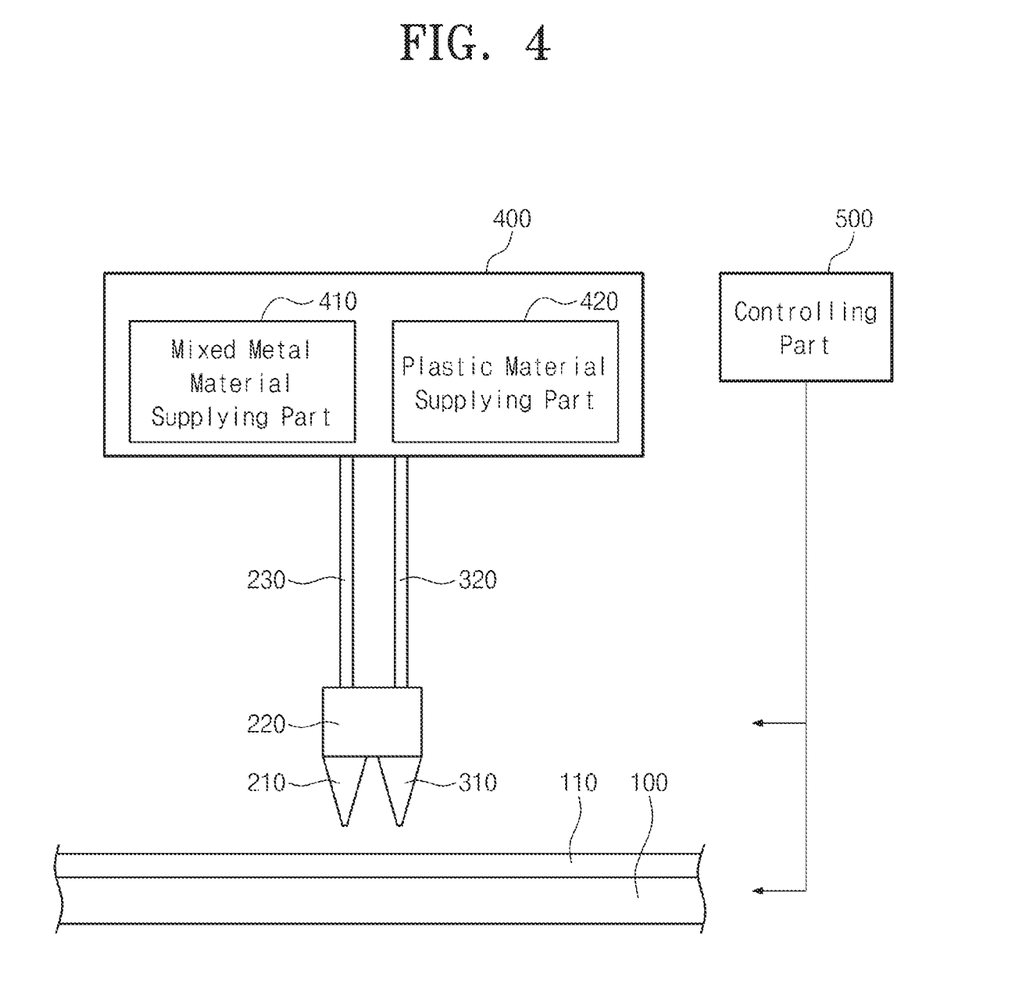
FIG. 4 is a drawing illustrating a printer that uses a metal material for 3D printing according to an embodiment of the inventive concept.

FIG. 4 is a drawing illustrating a printer that uses the metal material for 3D printing according to an embodiment of the inventive concept. A case in which the metal material for 3D printing is a filament was illustrated, but is merely exemplary. In another embodiment, the metal material for 3D printing may be in a powder form. For conciseness of description, descriptions which are substantially the same as descriptions given with reference to FIGS. 1 to 3, 5, and 6 are excluded.

Referring to FIG. 4, a supporting substrate 100 may be provided. The supporting substrate 100 may provide an area on which the metal material is laminated. The metal material may be substantially the same as the metal material for 3D printing described with reference to FIGS. 1 and 2. The metal material according to an embodiment of the inventive concept may be laminated through the melt lamination method (FDM or hot melt method). The supporting substrate 100 may move in a parallel direction to the top surface of the supporting substrate 100. The movement of the supporting substrate 100 may be controlled by a controlling part 500. A susceptor (or a heating/cooling plate) 110 may be provided on the supporting substrate 100. The susceptor 110 may provide the area on which the metal material is laminated.

A metal material discharge nozzle 210, a plastic material discharge nozzle 310, and a heating part 220 may be provided spaced apart from the top surface of the susceptor 110. The nozzles 210 and 310 may protrude toward the top surface of the susceptor 110 from the bottom of the heating part 220. In an embodiment, the nozzles 210 and 310 and the heating part 220 may contain non-metallic materials. For example, the nozzles 210 and 310 and the heating part 220 may contain ceramic, Teflon, glass, quartz, or aluminum that has an anodized surface. The metal material discharge nozzle 210 may discharge the metal material according to an embodiment of the inventive concept on the top surface of the susceptor 110. The plastic material discharge nozzle 310 may discharge the plastic material on the top surface of the susceptor 110. The nozzles 210 and 310 and the heating part 220 may move together in a parallel direction to the top surface of the supporting substrate 100 and in a perpendicular direction to the top surface of the supporting substrate 100. Movement of the nozzles 210 and 310 and the heating part 220 is controlled by the controlling part 500.

The heating part 220 may heat a metal material filament 230 and a plastic material (for example, poly lactic acid (PLA) or acrylonitrile butadiene styrene (ABS)) filament 320. In an embodiment, the heating part 220 may heat the filaments 230 and 320 to the same temperature. In another embodiment, the heating part 220 may heat the filaments 230 and 320 to different temperatures from each other. The filaments 230 and 320 may be melted through the heating part 220. The temperature of the heating part 220 may be about 100° C. to about 300° C. In an embodiment, the metal material filament 230 may contain a tin (Sn)-bismuth (Bi) alloy. Here, the temperature of the heating part 220 may be about 144° C. to about 300° C. In an embodiment, the metal material filament 230 may contain a tin (Sn)-silver (Ag)-copper (Cu) alloy. Here, the temperature of the heating part 220 may be about 220° C. to about 300° C. In an embodiment, the metal heating filament 230 may contain an indium (In)-silver (Ag) alloy. Here, the temperature of the heating part 220 may be about 144° C. to about 250° C. In an embodiment, the metal material filament 230 may contain a lead (Pb)-tin (Sn) alloy. Here, the temperature of the heating part 220 may be about 183° C. to about 300° C. In an embodiment, the insides of the nozzles 210 and 310 and/or the heating part 220 may be under vacuum atmospheres. In an embodiment, the insides of the nozzles 210 and 310 and/or the heating part 220 may be under foaming gas atmospheres and/or inert gas atmospheres.

A supplying part 400 supplying the filaments 230 and 320 to the nozzles 210 and 310 may be provided. The supplying part 400 may include a mixed metal material supplying part 410 and a plastic material supplying part 420. The supplying part 400 does not limit the locations of the mixed metal material supplying part 410 and the plastic material supplying part 420. In an embodiment, the mixed metal material supplying part 410 and the plastic material supplying part 420 may be filament rolls. The filament shaped metal material and plastic material may be respectively provided from the supplying parts 410 and 420 to the nozzles 210 and 310. The filaments 230 and 320 may be melted through the heating part 220. The molten materials may be discharged through the nozzles 210 and 310 to the top surface of the susceptor 110 and then hardened.

Typically, since the difference between the melting point of metal and the melting point of plastic is large, the single three dimensional structure cannot be formed through a single melt lamination process. For example, when a copper (Cu) or aluminum (Al) material is melted and then laminated on a plastic structure, the plastic structure may be deformed due to the heat from the copper or aluminum.

According to an embodiment of the inventive concept, the metal material filament 230 may be used with the plastic material filament 320 in the single 3D printing process. Here, the 3D printing process may be the melt lamination method (FDM or hot-melt method). Thus, the metal material filament 230 and the plastic material filament 320 may be alternately or concurrently melt discharged to form the single three dimensional structure. For example, the metal material filament 230 according to an embodiment of the inventive concept may be melt laminated on the plastic three dimensional structure. Here, the heat in the metal material may not be high enough to melt the plastic three dimensional structure. Therefore, the metal material for 3D printing may be melt laminated with the plastic material to form the single three dimensional structure. Since the metal material for 3D printing according to an embodiment of the inventive concept may be 3D printed with the plastic material, the time required for producing a product may be reduced. Moreover, since the secondary processing of the 3D printed metal is not needed, a time and cost reducing effect may be realized.

According to an embodiment of the inventive concept, a metal material for 3D printing may be provided, the metal material having a melting point of about 100° C. to about 300° C. Consequently, the metal material may be melt laminated with a plastic material.

According to an embodiment of the inventive concept, a metal material for 3D printing may be provided, in which a metal particle having a core-shell structure and a eutectic metal are mixed in the metal material. Consequently, the metal material may be conductive, and a change in the melting point thereof may be small even when the metal particle is added.

However, the effects of an embodiment of the inventive concept are not limited to the above.

The above description of exemplary embodiments of the technical concept of the present invention provides examples for describing the technical concept of the present invention. Therefore, it is understood that the present invention should not be limited to these exemplary embodiments but various changes and modifications can clearly be made by one with ordinary skill in the art within the spirit and scope of the present invention

What is claimed is:

1. A metal material for 3D printing, comprising:
   an alloy having a composition that comprises at least two metals and is at a eutectic point, and that has a melting point ranging from 100° C. to 300° C.;
   a metal particle that contains a metal selected from the group consisting of copper (Cu), silver (Ag), gold (Au), aluminum (Al), and platinum (Pt) and that has a melting point that exceeds 300° C.; and
   a shell that is coated on a surface of the metal particle and that comprises at least one material that is different from that of the metal particle and that is selected from the group consisting of silver (Ag), nickel (Ni), iron (Fe), silicon (Si), tungsten (W), cobalt (Co), aluminum (Al), carbon (C) and graphene.

2. The metal material of claim 1, wherein the alloy is selected from the group consisting of a tin (Sn)-bismuth (Bi) alloy, a tin (Sn)-silver (Ag)-copper (Cu) alloy, a lead (Pb)-tin (Sn) alloy, an indium (In)-silver (Ag) alloy, an indium (In)-tin (Sn) alloy, a tin (Sn)-zinc (Zn) alloy, a tin (Sn)-antimony (Sb) alloy, a tin (Sn)-indium (In)-silver (Ag) alloy, a tin (Sn)-lead (Pb)-silver (Ag) alloy, and an indium (In)-bismuth (Bi)-tin (Sn) alloy.

3. The metal material of claim 2, wherein the tin (Sn)-bismuth (Bi) alloy contains 42.95 wt % of tin and 57.05 wt % of bismuth, the tin (Sn)-silver (Ag)-copper (Cu) alloy contains 95.6 wt % of tin, 3.5 wt % of silver, and 0.9 wt % of copper, the lead (Pb)-tin (Sn) alloy contains 38.1 wt % of lead and 51.9% of tin, the indium (In)-silver (Ag) alloy contains 97 wt % of and 3 wt % of silver, the indium (In)-tin (Sn) alloy contains 52 wt % of indium and 48 wt % of tin, the tin (Sn)-zinc (Zn) alloy contains 91 wt % of tin and 9 wt % of zinc, the tin (Sn)-antimony (Sb) alloy contains 95 wt % of tin and 5 wt % of antimony, the tin (Sn)-indium (In)-silver (Ag) alloy contains 77.2 wt % of tin, 20 wt % of indium, and 2.8 wt % of silver, the tin (Sn)-lead (Pb)-silver (Ag) alloy contains 62.5 wt % of tin, 36.1 wt % of lead, and 1.4 wt % of silver, and the indium (In)-bismuth (Bi)-tin (Sn) alloy contains 51 wt % of indium, 32.5 wt % of bismuth, and 16.5 wt % of tin.

4. The metal material of claim 1, wherein the metal particle has a particle size that ranges from several nanometers to several hundred micrometers.

5. The metal material of claim 1, wherein the shell and the metal particle both contain at least one material that changes the melting point of the alloy at the eutectic point, and wherein the at least one material in the shell changes the melting point of the alloy at the eutectic point less than the at least one material in the metal particle.

6. A method for manufacturing a metal material according to claim 1, the method comprising:
    forming a first liquid alloy through a first heat treatment of materials for an alloy having a composition that comprises at least two metals and is at a eutectic point;
    forming a solid alloy through a first cooling of the liquid alloy;
    forming a second liquid alloy through a second heat treatment of the solid alloy;
    forming an alloy-particle mixture by mixing a metal particle with the second liquid alloy; and
    forming the metal material for three dimensional (3D) printing through a second cooling of the alloy-particle mixture,
    wherein the first heat treatment is conducted at a temperature that is higher than the eutectic point of said materials for an alloy, and the second heat treatment is conducted at a temperature ranging from 100° C. to 300° C.

7. The method of claim 6, wherein the solid alloy is selected from the group consisting of a tin (Sn)-bismuth (Bi) alloy, a tin (Sn)-silver (Ag)-copper (Cu) alloy, a lead (Pb)-tin (Sn) alloy, an indium (In)-silver (Ag) alloy, an indium (In)-tin (Sn) alloy, a tin (Sn)-zinc (Zn) alloy, a tin (Sn)-antimony (Sb) alloy, a tin (Sn)-indium (In)-silver (Ag) alloy, a tin (Sn)-lead (Pb)-silver (Ag) alloy, and an indium (In)-bismuth (Bi)-tin (Sn) alloy.

8. The method of claim 7, wherein the tin (Sn)-bismuth (Bi) alloy contains 42.95 wt % of tin and 57.05 wt % of bismuth, the tin (Sn)-silver (Ag)-copper (Cu) alloy contains 95.6 wt % of tin, 3.5 wt % of silver, and 0.9 wt % of copper, the lead (Pb)-tin (Sn) alloy contains 38.1 wt % of lead and 51.9% of tin, the indium (In)-silver (Ag) alloy contains 97 wt % of and 3 wt % of silver, the indium (In)-tin (Sn) alloy contains 52 wt % of indium and 48 wt % of tin, the tin (Sn)-zinc (Zn) alloy contains 91 wt % of tin and 9 wt % of zinc, the tin (Sn)-antimony (Sb) alloy contains 95 wt % of tin and 5 wt % of antimony, the tin (Sn)-indium (In)-silver (Ag) alloy contains 77.2 wt % of tin, 20 wt % of indium, and 2.8 wt % of silver, the tin (Sn)-lead (Pb)-silver (Ag) alloy contains 62.5 wt % of tin, 36.1 wt % of lead, and 1.4 wt % of silver, and the indium (In)-bismuth (Bi)-tin (Sn) alloy contains 51 wt % of indium, 32.5 wt % of bismuth, and 16.5 wt % of tin.

9. The method of claim 6, wherein the first heat treatment is performed under a vacuum atmosphere, a foaming gas atmosphere, an inert gas atmosphere, or a gas atmosphere in which the foaming gas and the inert gas are mixed.

10. The method of claim 6, wherein, in the first cooling, the temperature decreases at a rate of 50° C. to 200° C. per minute.

11. A 3D printing method that uses a metal material, the method comprising:
    providing a metal material according to claim 1;
    melting the metal material at 100° C. to 300° C.; and
    laminating the molten metal material.

12. The method of claim 11, wherein melting the metal material is performed under a vacuum atmosphere, a foaming gas atmosphere, an inert gas atmosphere, or a gas atmosphere in which the foaming gas and the inert gas are mixed.

13. The method of claim 11, wherein the metal particle has a particle size that is several nanometers to several hundred micrometers.

14. The method of claim 11, further comprising melting and laminating a plastic material, wherein the metal material and the plastic material form a single three dimensional structure when used in a single 3D printing process.

* * * * *